United States Patent
Swensen

[11] Patent Number: 6,065,916
[45] Date of Patent: May 23, 2000

[54] PORTABLE BASE FOR ANCHORING AND TRANSPORTING UNSTRABLE ARTICLES

[76] Inventor: Frederick B. Swensen, 6824 Peters Pike, Dayton, Ohio 45414

[21] Appl. No.: 09/228,242

[22] Filed: Jan. 11, 1999

Related U.S. Application Data

[60] Provisional application No. 60/077,192, Mar. 2, 1998.
[51] Int. Cl.⁷ .................................................. B60P 7/08
[52] U.S. Cl. .............................................. 410/97; 410/35
[58] Field of Search .................................. 410/35, 46, 96, 410/97, 99, 100, 115; 248/499; 108/55.1; 224/42.33

[56] References Cited

U.S. PATENT DOCUMENTS

| | | | |
|---|---|---|---|
| 2,372,967 | 4/1945 | Martin | 410/97 |
| 2,442,557 | 6/1948 | Cox | 410/96 X |
| 5,294,008 | 3/1994 | Dunaway | 248/499 X |
| 5,599,055 | 2/1997 | Brown | 410/97 X |
| 6,007,283 | 12/1999 | Labeur | 410/97 |

FOREIGN PATENT DOCUMENTS

| | | | |
|---|---|---|---|
| 3900112 | 7/1990 | Germany | 410/96 |
| 2229982 | 10/1990 | United Kingdom | 224/42.33 |

*Primary Examiner*—Stephen T. Gordon
*Attorney, Agent, or Firm*—William Weigl

[57] ABSTRACT

An unstable article to be transported is mounted on a portable base member. The base member consists of a webbing, a plurality of parallel rods interwoven with the webbing and a pair of channel members extending at right angles to the rods and interconnecting with the rods to form a frame for supporting the webbing in a tautened condition. The article utilizes the base member as a temporary, portable expanded base for the article to support the article and prevent its toppling, sliding or shifting during transport. The base member may be collapsed and rolled into a compact unit for shipping or storage.

11 Claims, 2 Drawing Sheets

PORTABLE BASE FOR ANCHORING AND TRANSPORTING UNSTRABLE ARTICLES

The application is based upon U.S. Provisional Patent Application Ser. No. 60/077,192 filed on Mar. 2, 1998.

This invention relates generally to a device for securing one or more articles relative to a vehicle for transporting the articles, and in particular to a portable base to which such articles can be lashed by means of tensioning tie-downs having opposing ends hooked to a webbing or grid surface of the base.

BACKGROUND

Stretchable tie-down cords, often referred to as bungee cords, have been in use for a considerable period to lash objects to roof and trunk-lid racks of automobiles. In addition, various kinds of techniques have been used to lash bicycles, motorcycles and a variety of other items to the beds of pick-up trucks by utilizing fixed anchoring members which are built into the truck. But when it comes to securing an unstable article on a flat vehicular surface which has no built-in anchoring means, such for example as the back bed of a station wagon, mini-van, panel or pick-up truck, hatchback or sport utility vehicle, the typical approach is to brace the article as well as possible against an inside corner and maintain it there with a heavier and more stable item or items.

SUMMARY OF THE INTENTION

An unstable article is secured to a portable base having a webbing or grid enabling use of tensioning tie-downs which are hooked into the webbing and stretched over the article to temporarily lash the article to the base while being transported. The webbing is affixed to a frame of interconnected rods which are interwoven with the webbing. The frame also includes channel members which interconnect the rods to one another. The webbing permits securing the article nearly universally anywhere on the base, i.e., its location is not limited by the position of bars or rails as in the case of permanently fixed racks. The base or frame is capable of being collapsed or disassembled for purposes of making it more compact for shipping or storage. In its broadest sense, the frame and webbing comprise a temporary enlarged base for the article to be transported, enabling it to be placed loosely on a flat horizontal bed or surface while preventing the article from toppling, sliding or otherwise shifting about uncontrollably as the vehicle makes turns, stops or starts.

A principal object of the invention is to provide an enlarged temporary base for an article to be transported while the base and article are resting freely on a flat surface.

More specifically, it is an object to provide such a base of nominal vertical height, the base consisting of a plurality of rods and a webbing with interstices and cross strands through which the rods may be interwoven.

A further object is to provide such a base of a construction enabling its easy collapsing and converting into a compact roll for purposes of storage and shipment.

Other objects and advantages will become apparent from the following description, in which reference is made to the accompanying drawings.

DESCRIPTION OF THE PREFERRED EMBODIMENT

Figure 1:
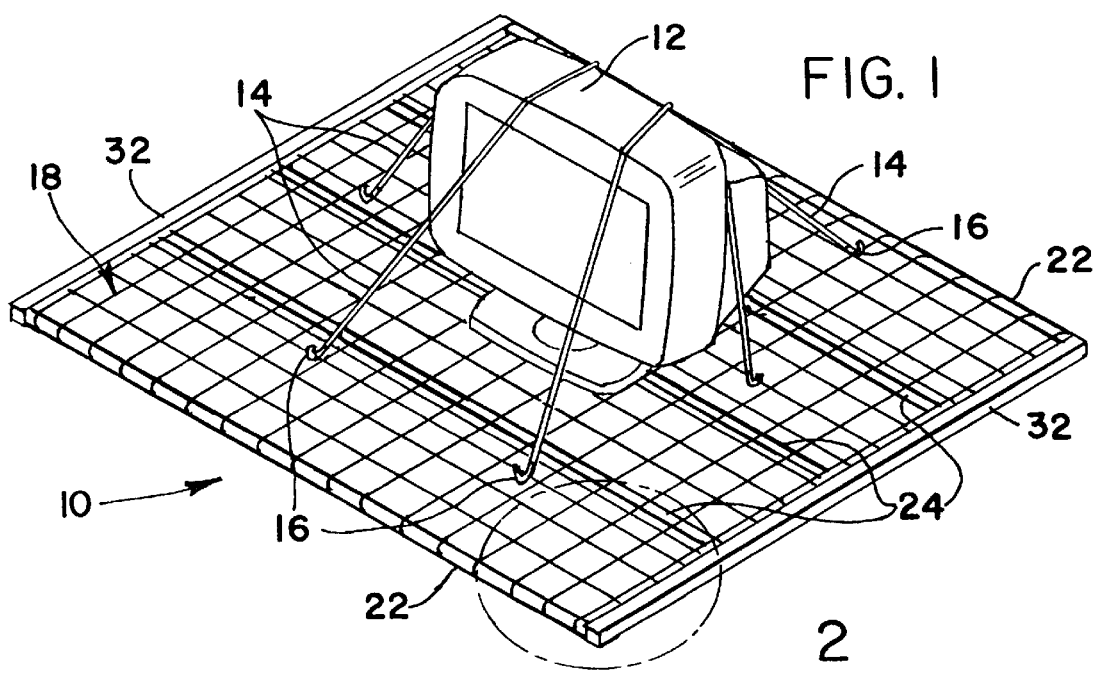
FIG. 1 is a simplified isometric view of the portable base with an article such as a computer monitor lashed thereto by means of tie-down cords.

FIG. 1 shows a simplified version of a base member 10 which serves to support an unstable article, which in this illustration is a computer monitor 12. The terminology "unstable article" as used herein means any kind of article which can topple, slide or shift during transport. Any of several different kinds of articles can carried by the base member, the one shown having instability due to its typical swivelability both about a vertical and a horizontal axis as well as its relatively small base in relation to its high-center-of-gravity cathode ray tube housing. The monitor or other article is lashed to the base member 10 by a plurality of tie-downs or bungee cords 14, each of which has a pair of hooks 16 firmly connected to the opposite ends thereof. Such cords are well known for purposes of lashing or securing articles to a support, ordinarily to stabilize the articles against unwanted movement, e.g., shifting, toppling or sliding.

Figure 2:
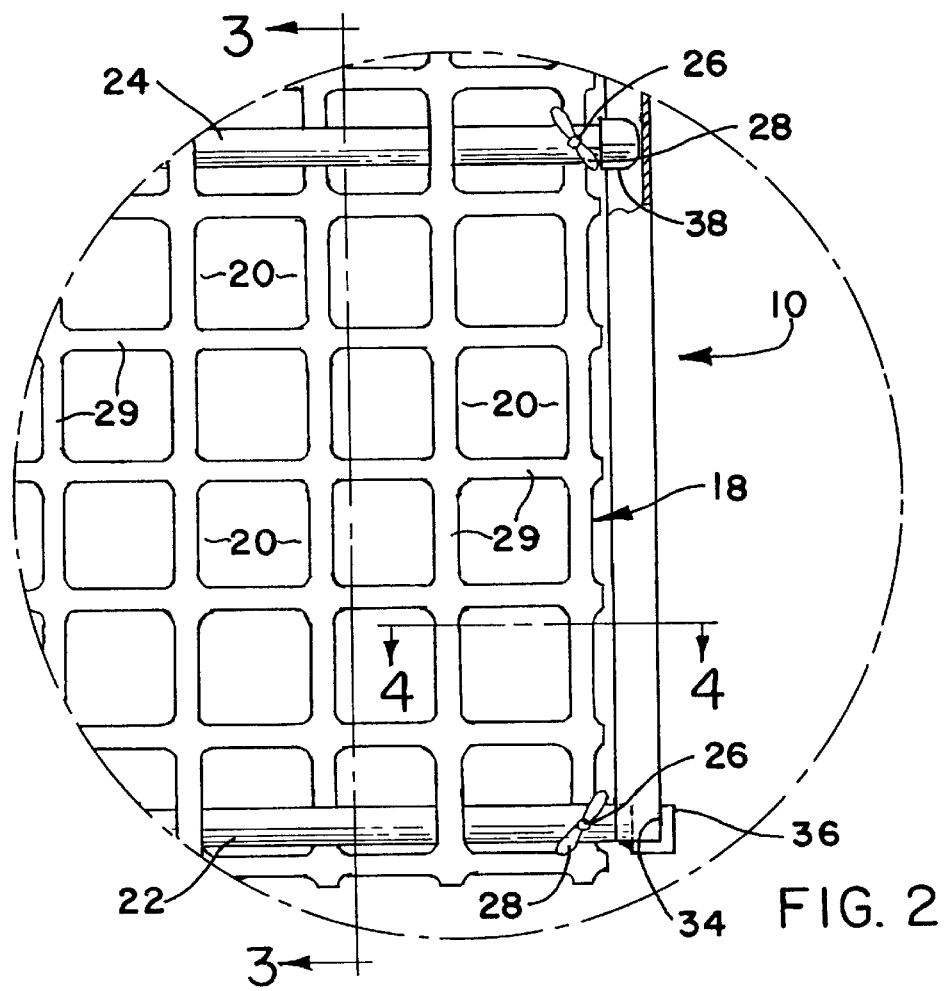
FIG. 2 is an enlarged detailed plan view of one corner of the base of FIG. 1, that corner being the one illustrated within the dot-dash oval 2 of FIG. 1

The preferred base member 10 is shown to be rectangular in plan view, because of its ease of manufacture in that configuration. Other shapes are also feasible, but for ease of explanation, only a rectangular version will be discussed. A webbing 18 having grid openings 20 throughout its surface covers the entire rectangular shape shown. Interwoven with or threaded through the webbing 18 at two opposite sides thereof are two outer rods 22. Parallel to rods 22 are a plurality of intermediate rods 24, which may differ from rods 22 only at their very ends, as will be noted later. Rods 24 are preferably also interwoven with the webbing 18, by threading them alternately through adjacent grid openings 20 as shown at the top and bottom of FIG. 2. The ends of rods 22 and 24 have small diameter holes 26 drilled therethrough. The holes 26 enable cable ties or other securing means 28 to hold the webbing 18 taut between the ends of the rods 22 and 24.

While a variety of different types of webbing or netting may be used, I prefer to use the type commonly found in the snow fence field, because of its strength, light weight and toughness. An example of such fence can be found in U.S. Pat. No. 5,661,944 issued on Sep. 2, 1997 and assigned to Tensar Corporation of Atlanta, Ga. The particular material discussed in that patent is said to consist of molecularly-oriented elongated cross strands 29 with unoriented strand junctions surrounding the grid openings 18. It serves the purposes of this invention quite well, but as mentioned earlier, is one of several different kinds of taut webbing which can be used. This thermoplastic material can be easily rolled, and when unrolled, can be kept in a flat, taut condition if secured to a flat structure. The cross strands and the opening size of this type of snow fence serves very well to enable universal securement of an article in any location on the base member 10 by hooking the elongated strands or anchoring with the hooks at the ends of the cords 14.

Figure 3:
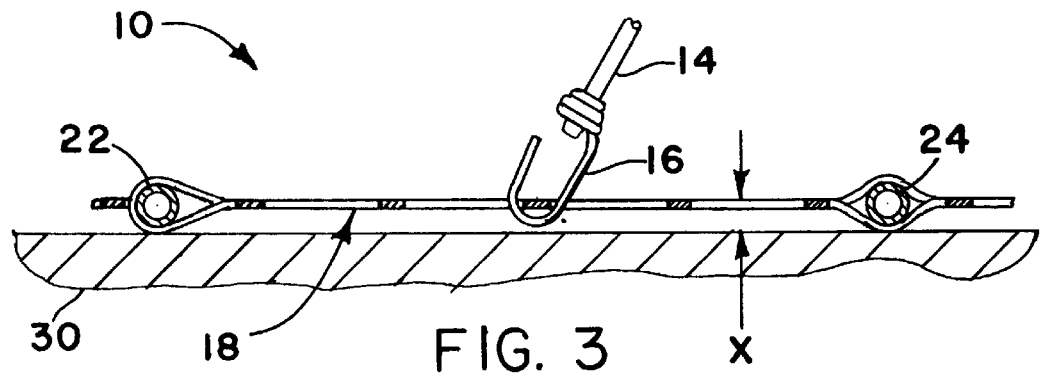
FIG. 3 is a fragmentary elevational view taken substantially along lines 3—3 of FIG. 2.

The strands 29 anchor the hooks 16 securely to the webbing 18 as shown in FIG. 3. That Figure also illustrates how the rods 22 and 24 interleave with the webbing between adjacent grid openings 20, with one strand extending over a rod and the next adjacent strand extending beneath a rod. As can be seen in FIG. 3, the majority of the webbing 18 is at a height "x" above a floor 30, which dimension is approximately one half the diameter of a rod 22 or 24. The vertical dimension of the base 10 may be on the order of ½ to ¾ of an inch. The rods may be of a shape other than cylindrical, but the shape shown is preferred because the rods then need no particular orientation relative to the webbing in order to rest evenly on the floor 30 or on carpeting on the floor. A resilient friction pad (not shown) may be used to substitute for carpeting in the case where the base member lays directly on a metal floor such as the bed of a pick-up truck. While the webbing below the rods 22 and 24 tends to have a frictional relationship with a floor, a friction pad can assist in inhibiting any tendency of the base and the article it is carrying to slide relative to the floor, particularly where their entire weight is insubstantial. The rods 22 and 24 have sufficient lateral flexibility to press the webbing surrounding the rods into contact with the floor. The rods may be metal, wooden dowel, fiberglass or some other material, their function being to provide enough rigidity to the frame and base to maintain the webbing taut for anchoring purposes.

Figure 4:
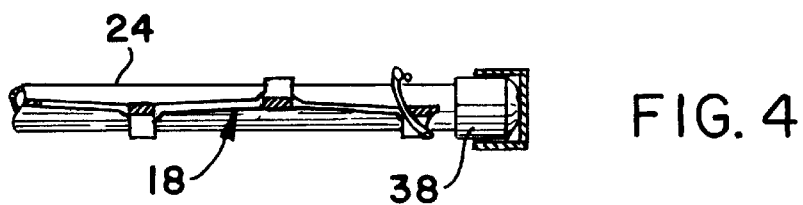
FIG. 4 is a fragmentary elevational view taken substantially along lines 4—4 of FIG. 2.

A pair of channels 32 which may be U-shaped in cross section cooperate with the rods 22 and 24 to form the stable framework of the base member 10. As can best be seen at the lower right hand of FIG. 2, an end of a channel 32 locks with the end of the rod 22 by having the channel's bottom end enter a slot 34 formed between the end of the rod 22 and an L-shaped stop member 36. The stop member 36 is secured to the rods 22 by welding or other fastening means. All four corners may be and preferably are similarly constructed. As can be seen in FIG. 4, the intermediate rods 24 can be provided with end caps 38 of a diameter closely approximating the dimension between the legs of the U-shaped cross section of the channels 32. The rods 24 are thus restrained against vertical movement within the channels when supporting an article.

When the base member 10 rests on the floor 30 of a vehicle and has an article secured thereto as shown in FIG. 1, the base member essentially enlarges the "footprint" of the article by temporarily being integral therewith. A typical computer monitor 12 would be very unstable if one were to permit it to rest without being restrained in some manner in the back of a station wagon, e.g., when starting, stopping or turning a corner. By fastening the monitor 12 to a larger base, its being integral with the larger base permits it to rest freely on the floor without further securement. If the floor is carpeted, the rods 22 and 24 will tend to sag slightly from the weight of the monitor and will grip the carpet. The framework of the base member 10, while being capable of limited flexing if unsupported, becomes very rigid within its own plane once the weight of an article is added thereto and the article is lashed securely to the webbing 18 by the cords 14.

Figure 5:
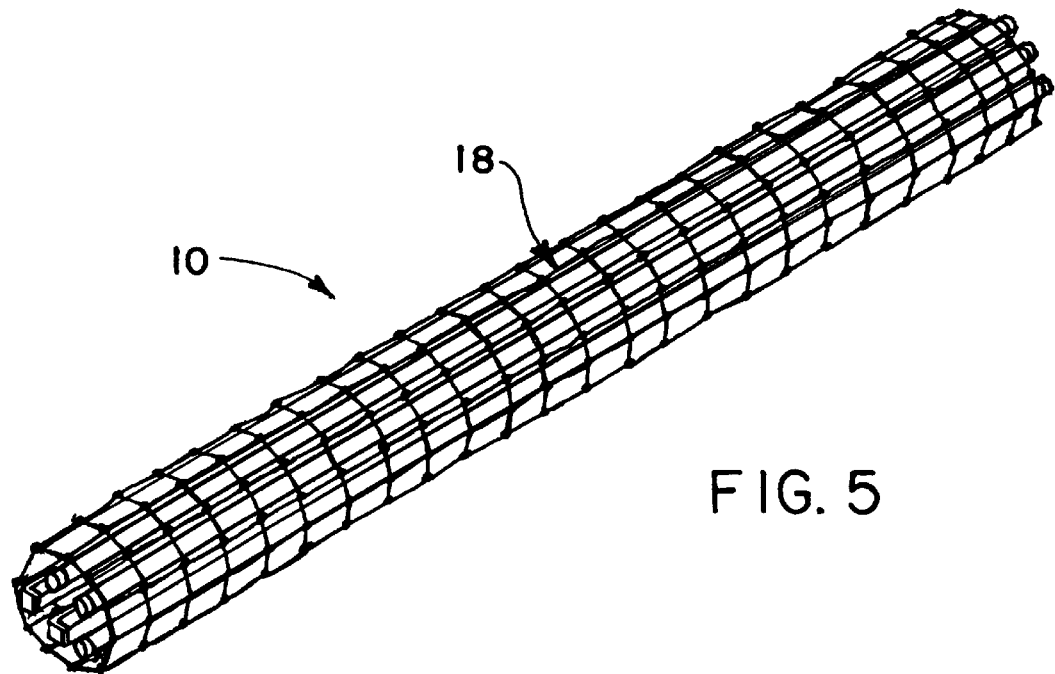
FIG. 5 is a simplified isometric view of the base of FIG. 1 after it has been collapsed and rolled up for storage or shipping.

When not in use, the base member 10 can be disassembled or collapsed and the full structure rolled up fairly tightly as shown in simplified fashion in FIG. 5. The rolled condition enables easy storage of the unit, as well enabling easy shipping or keeping boxed in inventory at a retail operation. Breaking down the unit from assembly for storage can best be seen from viewing FIG. 2 at the lower right hand corner. Although the webbing 18 is taut when in the position of FIG. 1, a limited measure of web stretching within its plane is possible. For example, rod 22 can be pulled downwardly as viewed in FIG. 2 until the end of the channel 32 captured within slot 34 is no longer entrapped. When one corner of channel 32 and rod 22 is disconnected from slot 34, the same channel can be slipped from the corresponding slot at its opposite end and the channel can be moved laterally away from the end caps 38 to disengage the channel from the intermediate rods 24. Once the first channel has been removed from the framework, the base member becomes very flimsy and the second channel can be removed with ease. The two channels 32 can then be laid on the webbing parallel to and alongside one of the rods 22 and the webbing and rods 22 and 24 rolled to the shape of FIG. 5. Reassembly is accomplished in the reverse order, with the final corner requiring the webbing to be stretched to enable the end of channel 32 to enter slot 34 and lock everything together when tension in the webbing is relaxed.

Various forms of interconnection at the corners of the base member 10 are feasible, but I prefer to use a fastening technique that permits assembly and disassembly without the use of tools. Additionally, while I prefer to have a pair of single piece channels, they need not be channel-shaped, nor need they be in one elongated piece. The size of the base member 10 in plan view can be of any dimension to fit the floor configuration of the vehicle with which it will ordinarily be used. It is considered within the scope of my invention to sell the elements of the base member in kit form, allowing the webbing to be cut to a specific size with scissors, sawing the lengths of the rods and channels to the new size of webbing, drilling new holes 26 if necessary, and tailoring the size of the base member to suit a person's own needs. Since the rods are easily interwoven with the webbing, accomplishing this is believed sufficiently easy to do for an average home handyman.

Various other changes may be made without departing from the spirit and scope of the claims.

Having described my invention, I claim:

1. A free-standing device for stabilizing a normally unstable article during vehicular transport, said stabilizing resulting from securing said article to an upper surface of the device, said device comprising:

a base member comprised of a plurality of interconnected elongated members forming a portion of a relatively flat horizontally-rigid frame, the horizontal dimensions of which base member are greater than the horizontal base dimensions of said article;

a webbing stretched over said frame and tautened relatively thereto, said webbing being associated with said frame and having the elongated members thereof being interwoven therewith; and said webbing further having openings therein over essentially the entire surface of the device whereby a plurality of stretchable tie-down cords having hooks at their opposite ends may be hooked into a first part of said webbing through said openings, tensioned over the article and then hooked into other openings in the webbing on the opposite side of said article, to lash said article to said device in order to stabilize it against tumbling, sliding or shifting during vehicular transport.

2. The invention set forth in claim 1 wherein said webbing comprises a relatively flat flexible sheet of thermoplastic material having high molecular strength against stretching when flat, said sheet being capable of being formed into a roll.

3. The invention set forth in claim 2 wherein said sheet is generally rectangular, and wherein said elongated members comprise a pair of outer parallel rods on two opposing sides of said rectangular sheet and at least one additional rod parallel to and intermediate said outer rods, and further includes a pair of channel members along the other opposing sides of said rectangular sheet, said channel members being U-shaped in cross section and entrapping the ends of said rods adjacent their respective channel member within the U-shaped portion, said webbing being fixed to opposite ends of all of said rods to form said webbing and rods into a unitary surface, whereby, when both of said channel members are interconnected with said rods, said device is relatively rigid within its plane.

4. The invention set forth in claim 3 wherein said channel members are removable relative to said rods and webbing whereby said rods and webbing may be rolled about an axis extending in the direction of extension of said rods.

5. The invention set forth in claim 4 wherein said two outer rods and said channel members are releasably connected at the four corners of the rectangular frame and wherein the ends of the intermediate rod is restrained within the U-shaped portion against movement normal to the plane of the device.

6. The invention set forth in claim 5 wherein the release connection at each corner is capable of being assembled and disassembled without the use of tools.

7. The invention set forth in claim 1 wherein said webbing consists of a flat sheet of thermoplastic snow fence material having a grid of molecularly-oriented elongated strands extending at right angles to each other and said openings comprise grid openings between adjacent strands.

8. The invention set forth in claim 7 wherein, when said webbing is in a flat tautened condition relative to said elongated members, said webbing between adjacent elongated members lies essentially in a plane coincident with the centers of said elongated members whereby to be spaced slightly above a surface on which said frame rests to enable tie-down cord hooks to be inserted through one opening into the webbing, pass beneath a strand, and hook into the next adjacent opening.

9. The invention set forth in claim 8 wherein said elongated members comprise a frame of parallel rods all of which are of the same length, and a pair of elongated members normal to and interconnected with said rods at opposite ends thereof so as to provide a rectangular frame.

10. The invention set forth in claim 9 wherein said part of elongated members each comprise U-shaped channels which are open toward and entrap the ends of the rods between the opposing legs of the U-shaped channels.

11. The invention set forth in claim 10 wherein the ends of each channel interlock with opposing ends of the outermost ones of said rods.

\* \* \* \* \*